(12) United States Patent
Brown et al.

(10) Patent No.: US 12,484,491 B1
(45) Date of Patent: Dec. 2, 2025

(54) WET SOIL PLANT NURSERY SYSTEM

(71) Applicants: Franklin Ashbell Brown, Miramar, FL (US); Ralph Eugene McCoy, Fountain, CO (US)

(72) Inventors: Franklin Ashbell Brown, Miramar, FL (US); Ralph Eugene McCoy, Fountain, CO (US)

( * ) Notice: Subject to any disclaimer, the term of this patent is extended or adjusted under 35 U.S.C. 154(b) by 0 days.

(21) Appl. No.: 18/106,362

(22) Filed: Feb. 6, 2023

Related U.S. Application Data

(60) Provisional application No. 63/306,937, filed on Feb. 4, 2022.

(51) Int. Cl.
| | |
|---|---|
| *A01G 9/16* | (2006.01) |
| *A01G 9/24* | (2006.01) |
| *B63B 35/44* | (2006.01) |
| *B63B 35/50* | (2006.01) |
| *B64U 70/92* | (2023.01) |

(52) U.S. Cl.
CPC ............... *A01G 9/16* (2013.01); *B63B 35/44* (2013.01); *B63B 35/50* (2013.01); *A01G 9/243* (2013.01); *B63B 2035/4493* (2013.01); *B64U 70/92* (2023.01)

(58) Field of Classification Search
CPC ........ A01G 9/16; A01G 31/024; B63B 35/44; B63B 35/50; B63B 2035/4493; B64U 70/92
See application file for complete search history.

(56) References Cited

U.S. PATENT DOCUMENTS

| | | | |
|---|---|---|---|
| 2008/0276533 A1* | 11/2008 | Kania ................... | A01K 31/14 119/329 |
| 2012/0006743 A1* | 1/2012 | Streb ...................... | A01G 9/28 210/602 |
| 2017/0354097 A1* | 12/2017 | Hadley .................. | A01G 9/02 |
| 2019/0112012 A1* | 4/2019 | Boswell ................ | A01G 31/02 |
| 2019/0216030 A1* | 7/2019 | Myers .................... | A01G 33/00 |
| 2020/0383276 A1* | 12/2020 | Walker ................ | A01G 9/0295 |
| 2021/0164954 A1* | 6/2021 | Lewis .................... | A01G 9/02 |
| 2021/0386027 A1* | 12/2021 | Kenkel ................ | A01G 25/023 |
| 2024/0043301 A1* | 2/2024 | Tannas .................. | C02F 3/327 |
| 2024/0182338 A1* | 6/2024 | Liu ........................ | C02F 3/327 |

OTHER PUBLICATIONS

CN_108840444_A_ (Year: 2018).*
CN_113086111_A (Year: 2021).*
KR_20170003882_A (Year: 2017).*
KR_20190016386_A (Year: 2018).*

* cited by examiner

*Primary Examiner* — Joshua D Huson
*Assistant Examiner* — Edgar Reyes
(74) *Attorney, Agent, or Firm* — MALLOY & MALLOY, PL

(57) ABSTRACT

A wet soil plant nursery system for growing and planting wet soil plants in natural or artificial hydric soil environments. The system can function as or in conjunction with an aeronautical platform connected in moveable relation to at least one translucent enclosure wherein at least one translucent enclosure may, in part, grow and plant wet soil plants. Further, the system can have multiple attachments connected thereto, such as sensor arrays for monitoring plant growth, suites of electronics for flight data, walkways that are affixed to seawalls which lead to aeronautical platforms, and more. In addition, the system, as a whole, may be affixed in an operative position or a non-operative position.

20 Claims, 14 Drawing Sheets

WET SOIL PLANT NURSERY SYSTEM

CROSS REFERENCE TO RELATED APPLICATION(S)

This application claims benefit to a U.S. Provisional Patent Application having Ser. No. 63/306,937 filed on Feb. 4, 2022. The above application is incorporated by reference herein in its entirety.

FIELD

The present disclosure relates generally to a wet soil plant nursery system for growing wet soil plants in natural or artificial hydric soil environments. More specifically, the present disclosure relates to a wet soil plant nursery system for growing and planting wet soil plants in hydric soil environments. Also, the present disclosure relates to a system for growing and planting wet soil plants which can function with an aeronautical platform connected in a moveable relation thereto. Further, the present disclosure is related to a wet soil plant nursery system which can function with an aeronautical platform connected thereto and be kept in a non-operative orientation.

BACKGROUND

At present day, wet soil plants are under threat due in part to various human activities such as coastal development, aquaculture farming, and logging. Therefore, the destruction of wet soil plants is often considered a problem due to the loss of valuable ecosystems and habitats wet soil plants provide. In addition, the destruction of wet soil plants is often considered a problem because wet soil plants can prevent coastal erosion and flooding. Moreover, wet soil plants are important carbon sinks and help to reduce the amount of carbon dioxide in the atmosphere.

Therefore, planting and growing wet soil plants can provide various environmental benefits. One such benefit is providing a habitat and nursery for various species, including fish, crustaceans, birds, and mammals, leading to an increase in biodiversity for areas that contain wet soil plants. Further, another such benefit is that wet soil plants may help protect coastal areas, communities, and infrastructure from the impacts of storm surges, waves, and erosion by acting as physical barriers. Lastly, wet soil plants can store large amounts of carbon in their biomass and soils, allowing them to carry the benefit of removing and storing carbon dioxide from the atmosphere.

As such, there is a need for a wet soil plant nursery system to grow and plant wet soil plants in natural or artificial hydric soil environments.

In addition, in the present day, climate regulation is an ever-growing subject in political and governmental regulation. In fact, governments across the globe have implemented, or are considering implementing, financial incentives for individuals, entities, or corporations that provide or otherwise take on carbon-neutral or carbon-negative initiatives/projects. As wet soil plants can store large amounts of carbon in their biomass and solids, growing and planting wet soil plants may be considered carbon-neutral or carbon-negative initiatives/projects. Such initiatives/projects May allow individuals, entities, or corporations to offset carbon output, decrease carbon output, or trade carbon output amongst themselves. Should tax credits be associated with such initiatives/projects, individuals, entities, or corporations may sell, purchase, or profit from such initiatives/projects. Additionally, such initiatives/projects, when the initiatives/projects are marketed, or the effects of the initiatives/projects are marketed, may increase the profitability of individuals, entities, or corporations.

As such, there is a need for a wet soil plant nursery system to grow and plant wet soil plants in natural or artificial hydric soil environments to carry out carbon-based initiatives/projects.

Moreover, today, drones (which may be known as manned, unmanned, partially autonomous, or fully autonomous aerial vehicles) are a technology that is being developed and has the potential to revolutionize the way goods are delivered, how individuals commute, or how services are performed. The technology has the potential to provide faster, more efficient, and more convenient delivery services, transportation, or experiences in remote/rural or urban areas. However, platforms which support drones are either industrial in appearance, potentially harmful to the environments in which they are placed or needing more technology which might support drone flight/functionality.

As such, there is a need for an aeronautical platform that can provide drone flight/functional technology, a non-harmful or beneficial presence in an environment, and mitigate an industrial appearance.

In sum, there is a need for a wet soil plant nursery system that may function as, or act in conjunction with an aeronautical platform, where such a system can grow and plant wet soil plants in natural or artificial hydric soil environments while providing a platform for drone flight/function, a non-harmful or beneficial presence in an environment, and mitigate an industrial appearance.

SUMMARY

The present disclosure provides for a new wet soil plant nursery system.

A wet soil plant nursery system may comprise at least one translucent enclosure. A translucent enclosure may have at least one interior reservoir, at least one aperture, at least one opening, and at least one motion system attachment mechanism. Where a translucent enclosure May have at least one aperture, the at least one aperture may comprise a semi-permeable material therein or thereon and be configured and dimensioned to allow fluid to pass through said at least one aperture. Where a translucent enclosure may have at least one interior reservoir, the interior reservoir may comprise at least one plant placement system which may comprise at least one soil filled semi-permeable membrane configured and dimensioned to allow at least one wet soil plant to inhabit said at least one soil filled semi-permeable membrane.

As a wet soil plant nursery system may comprise a translucent enclosure, the translucent enclosure may have at least one buoyancy system affixed thereto, a sensor array system affixed thereto, and a breakaway system. Should a translucent enclosure have a sensor array system affixed thereto, the sensor array system may be in operative communication with at least one computing device.

Further, as a wet soil plant nursery system may comprise a translucent enclosure, the translucent enclosure may be operatively attached to at least one motion system via at least one motion system attachment mechanism. Moreover, a translucent enclosure may be configured and dimensioned to operatively connect with other translucent enclosures.

Continuing, a wet soil plant nursery system may comprise at least one translucent enclosure and at least one motion system configured and dimensioned to operatively connect at least one translucent enclosure in a moveable relation to at least one aeronautical platform. Where a wet soil plant nursery system may comprise at least one translucent enclosure, a translucent enclosure may be configured and dimensioned to operatively connect with at least one second translucent enclosure. Moreover, at least one translucent enclosure may have at least one buoyancy system affixed thereto.

Where a wet soil plant nursery system may comprise at least one translucent enclosure operatively connected in a moveable relation to at least one aeronautical platform, the at least one aeronautical platform may be comprised of translucent material and configured and dimensioned to affix to a walkway. At least one aeronautical platform may also comprise at least one motion system attachment member and a suite of flight data electronics. Where an aeronautical platform may comprise a suite of flight data electronics, the suite of flight data electronics may be operatively powered by at least one battery wherein the at least one battery may be operatively powered by at least one renewable energy source. Further, a suite of flight data electronics may be in operative communication with at least one computing device.

As the at least one aeronautical platform may be configured and dimensioned to affix to a walkway, the walkway may also be comprised of translucent material. Further, the walkway May comprise a hinge attachment member wherein the hinge attachment member may be configured and dimensioned to affix to a hinge wherein the hinge may be configured and dimensioned to rotate the walkway about a sea wall.

Additionally, a wet soil plant nursery system may comprise at least one translucent enclosure that is operatively attached to at least one motion system. The at least one motion system may be configured and dimensioned to operatively connect at least one translucent enclosure in a moveable relation to at least one aeronautical platform where such an aeronautical platform is affixed to a hinge which is configured and dimensioned to rotate the aeronautical platform about a sea wall.

BRIEF DESCRIPTION OF THE DRAWINGS

For a fuller understanding of the nature of the present disclosure, reference should be had to the following detailed description taken in connection with the accompanying drawings in which.

Like reference numerals refer to like parts throughout the several views of the drawings.

DETAILED DESCRIPTION

Figure 1:
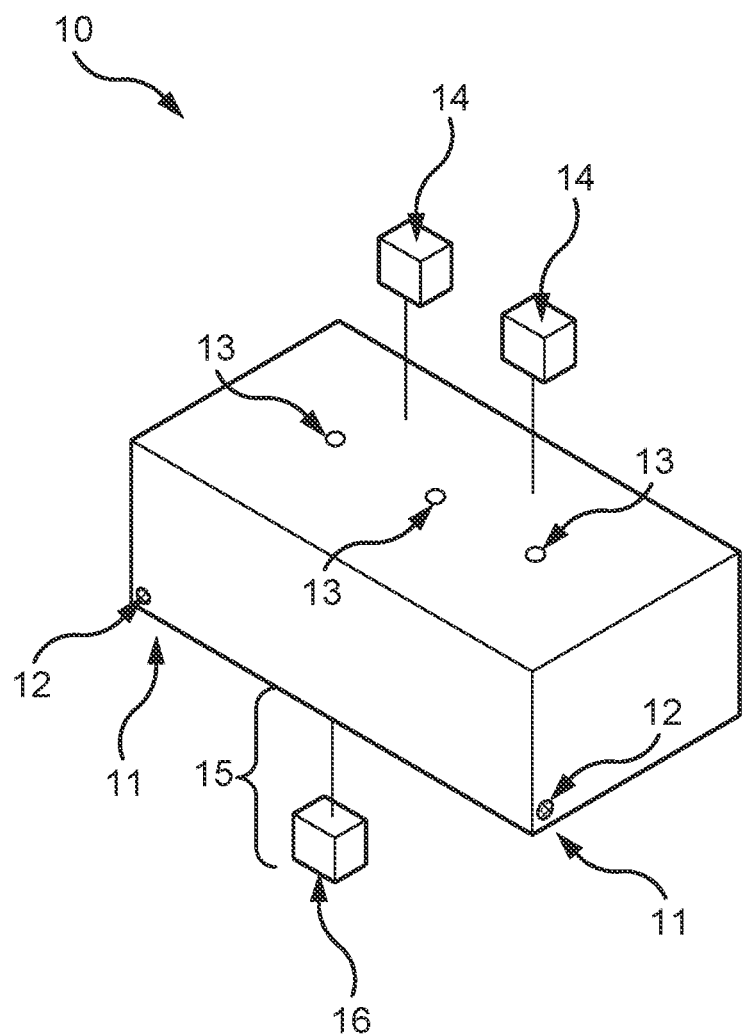
FIG. 1 is a perspective view of a wet soil plant nursery system's translucent enclosure.

Turning now descriptively to the figures, FIG. 1 illustrates a wet soil plant nursery system's translucent enclosure 10 from a perspective/isometric view.

In FIG. 1, a translucent enclosure 10 can be seen. The translucent enclosure 10 may be made from a translucent material wherein some light is able to pass through from one side of the material, but not enough light to clearly see objects on an opposite side of the material. A translucent material which makes up the translucent enclosure 10 may be made from recyclables, such as plastics which have been formed from post-consumer waste like milk jugs or other household plastics. The translucent enclosure 10 may take many shapes, such as, but not limited to a cube, sphere, cylinder, cone, pyramid, rectangular prism, torus, semi-torus, or combination of such shapes. As the translucent enclosure 10 may take many shapes, where it is conjoined, fused, or otherwise made into a structure, water-tight seals may line points of conjunction, fusion, or points where the translucent enclosure 10 is otherwise joined together and made into a structure. Further, the translucent enclosure 10 may be comprised of a number of different translucent materials and combinations of shapes so as to customize the buoyancy of the translucent enclosure 10 for different environments the translucent enclosure 10 may be placed in/exist in. As may be apparent, the translucent enclosure 10 may have an exterior and an interior, wherein the interior may be described as an interior reservoir (as will be subsequently described in more detail). Moreover, as the translucent enclosure 10 may take many shapes, it may be structured to connect or otherwise conjoin to other translucent enclosures. A translucent enclosure 10 may connect or otherwise enjoin to other translucent enclosures by fastening means or conjoining devices. By way of example, where a translucent enclosure 10 may be shaped as a semi-torus, it may be conjoined with other semi-torus shaped translucent enclosures to form a larger semi-torus, or a full torus shape of conjoined translucent enclosures 10.

The translucent enclosure 10 may also have at least one aperture 11 in at least a wall, partition, or barrier of the translucent enclosure 10. An aperture 11 may allow for fluids or gases to pass to or from an exterior of the translucent enclosure 10 to or from the interior (including the interior reservoir) of the translucent enclosure 10. At least one aperture 11 may also be fitted with a semi-permeable material 12 within or on the at least one aperture 11. A semi-permeable material 12 may be known as a material that allows some substances to pass through the semi-permeable material 12, while preventing the passage of other substances. In effect, the semi-permeable material 12, as fitted within or on at least one aperture 11, may act as a mesh to prevent larger substances which are not fluids or gases from passing to or from the exterior of the translucent enclosure 10 to or from the interior (including the interior reservoir) of the translucent enclosure 10. As should be apparent, as a translucent enclosure 10 may have at least one aperture 11 (with or without semi-permeable material 12 within or on at least one aperture 11), a translucent enclosure 10 may have multiple apertures 11 placed over the translucent enclosure 10.

Further, the translucent enclosure 10 may also have at least one opening 13 in at least one wall, partition, top, or barrier of the translucent enclosure 10. An opening 13 may allow for solids to pass to or from an exterior of the translucent enclosure 10 to or from the interior (including the interior reservoir of the translucent enclosure 10. As will be subsequently described, an opening 13 may also allow for solids to pass to or from an exterior of the translucent enclosure 10 to or from the interior (which may include a plant placement system as will be subsequently described) within the interior reservoir of the translucent enclosure 10. An opening 13, may generally allow for at least a portion of a wet soil plant (at any stage of life such as seedling, adolescent, or fully grown) to traverse the opening 13 and thus exist within an interior of the translucent enclosure 10 and the exterior of the translucent enclosure 10. For example, a wet soil plant may exist within the interior of a translucent enclosure 10, where the wet soil plant's trunk extends from the interior of the translucent enclosure 10 to the exterior of the translucent enclosure 10 through the opening 13. In such an example, the branches of a wet soil plant are protruding from an opening 13, exposed to the exterior of the translucent enclosure 10. As such, the opening 13, when acting with a plant placement system (as will be subsequently described) may allow for a wet soil plant to grow from an interior of a translucent enclosure 10, through an opening 13, and thus out to an exterior of a translucent enclosure 10. As should be apparent, as a translucent enclosure 10 may have at least one opening 13, a translucent enclosure 10 may have multiple openings 13 placed over the translucent enclosure 10. As should also be apparent, the translucent enclosure 10 may have the means (through an opening 13 or otherwise, to place a wet soil plant within the translucent enclosure 10).

With continued reference to FIG. 1, the translucent enclosure 10 may also have at least one motion system attachment mechanism 14 affixed thereto. A motion system attachment mechanism 14 may be described as one or a combination of an anchor, hook, attachment point, fastener, connection, catch, clasp, clip, rail, guidance system, wheel, motorized wheel, or buckle wherein a translucent enclosure 10 leverages the motion system attachment mechanism 14 to affix to a motion system (as will be subsequently described in more detail). As should be apparent, as a translucent enclosure 10 may have at least one motion system attachment member 14, a translucent enclosure 10 may have multiple motion system attachment members 14 placed over, within, or throughout the translucent enclosure 10.

Further, the translucent enclosure 10 may also have at least one buoyancy system 15 affixed to the translucent enclosure 10. The at least one buoyancy system 15 may be structurally configured to assist the translucent enclosure 10 in floating, and the at least one buoyancy system 15 may be comprised of at least one buoyancy device 16. A buoyancy system 15 may be made up of multiple buoyancy devices 16, or of just one buoyancy device 16. Buoyancy devices 16 may be, but are not limited to weights, inflatables, exterior coatings, or exterior sheaths. As a result, and by way of non-limiting example, a translucent enclosure 10 may have a buoyancy system 15 made up of two buoyancy devices 16 wherein one buoyancy device 16 is a weight affixed to a translucent enclosure 10 and the other buoyancy device 16 is a set of inflatable bladders and accompanying air pumps which exist within the translucent enclosure 10. Should an exterior sheath act as a buoyancy device 16, where the exterior sheath is affixed to the translucent enclosure 10, the translucent enclosure 10 may have light blocked from reaching the interior of the translucent enclosure 10 as a result of the exterior sheath.

A buoyancy system 15 may serve a range of different functions but is primarily oriented towards keeping the translucent enclosure 10 upright or at a certain orientation, and at a specific depth in water (wherein portions of the translucent enclosure 10 may be at specific depths when compared to other portions). For example, the translucent enclosure 10 may be submerged or partially submerged in different types of water (salt, fresh, brackish) in different environments (ocean, lake, river, artificial) to accomplish at least one of its objectives of growing and planting wet soil plants. As a result, and by way of non-limiting example, should the wet soil plant nursery system be used in saltwater in the ocean, it may have a buoyancy system 15 with buoyancy devices 16 such as weights and exterior sheaths. In such an example, the weights, when acting as buoyancy devices 16, may be used to ensure the translucent enclosure 10 remains at a substantially upright orientation, wherein the opening 13 of the translucent enclosure 10 can be clearly seen from a bird's eye view. Thus, the weights, when acting as buoyancy devices 16, serve as counterweights to waves, winds, or other forces which may alter the orientation of a translucent enclosure 10. Further, in such an example, the exterior sheaths, when acting as buoyancy devices 16, may inflate or deflate (with the assistance of a pump) as wet soil pants grow and/or get heavier (or as more or less water enters the translucent enclosure 10 through at least one aperture 11, or because of changes in weather/water conditions). As a result, the exterior sheaths, when acting as buoyancy devices 16, can alter the level of depth portions of the translucent enclosure 10 may be submerged in. Where a buoyancy system 15 may be used with a plethora of different buoyancy devices 16, the buoyancy system 15 (when acting with a sensor array system, as will be described in more detail), can selectively submerge portions of the translucent enclosure 10 to specific depths, which may then allow certain volumes of water to pass through the translucent enclosure's 10 at least on aperture(s) 11, thus filling the translucent enclosure's 10 interior with a certain volume of water.

As the buoyancy system 15 may be comprised of an exterior coating as one of the buoyancy system's 15 buoyancy devices 16, the exterior coating may comprise certain buoyancy characteristics which alter the buoyancy of the translucent enclosure 10 (even if the exterior coating minimally alters the buoyancy of the translucent enclosure 10). Should an exterior coating be used as one of the buoyancy system's 15 buoyancy devices 16, the coating may cause the translucent enclosure 10 to become opaque, at least where the translucent enclosure 10 is covered with an exterior coating.

As should be apparent, as a translucent enclosure 10 may have at least one buoyancy system 15, a translucent enclosure 10 may have multiple buoyancy systems 15 placed over, within, or throughout the translucent enclosure 10.

Figure 2:
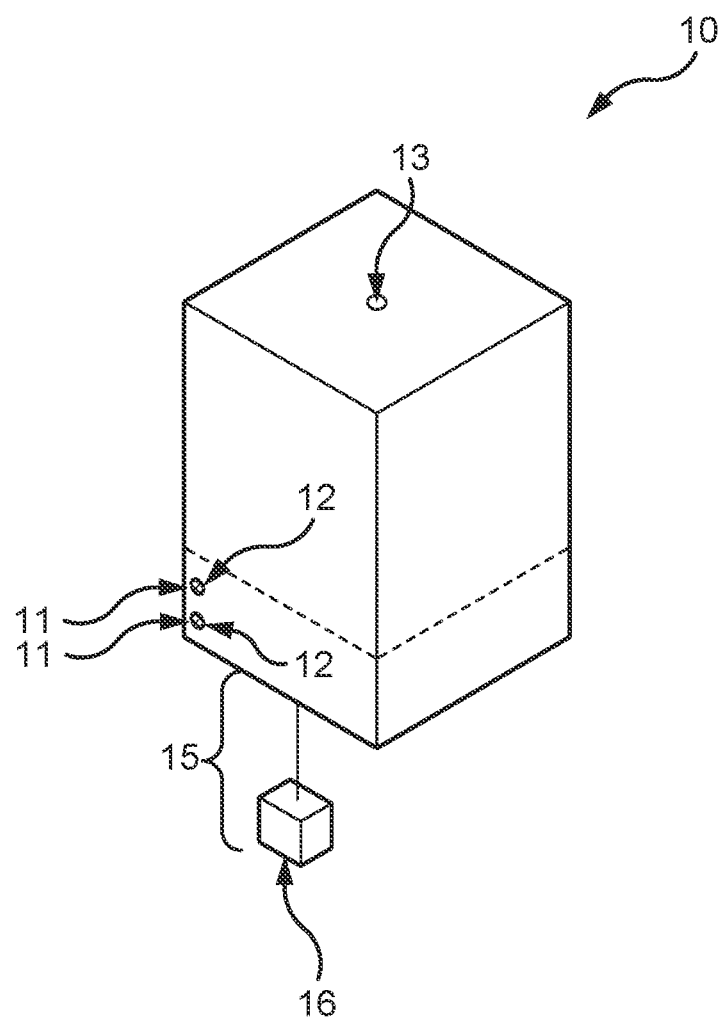
FIG. 2 is a perspective view of a wet soil plant nursery system's translucent enclosure.

Turning now descriptively to FIG. 2, FIG. 2 illustrates a wet soil plant nursery system's translucent enclosure 10 from a perspective/isometric view.

In FIG. 2, a translucent enclosure 10 can be seen. Additionally, elements such as the translucent enclosure's 10 at least one aperture 11, semi-permeable material 12, at least one opening 13, buoyancy system 15, and buoyancy device 16 can also be seen. With reference to FIG. 2, water may engulf the translucent enclosure 10 as indicated by a dashed line A. As a result, FIG. 2 may be used to illustrate that the wet soil plant nursery system's translucent enclosure 10 may be at least partially submerged in water. As should be apparent, dashed line A is only a depiction of how water may engulf the translucent enclosure 10, and the level to which water may engulf the translucent enclosure 10 may be higher or lower, or more or less. Moreover, and as described above, as the translucent enclosure 10 may have an exterior and interior, water may engulf the translucent enclosure's 10 exterior up to dashed line A, and pass through the translucent enclosure's 10 aperture(s) 11, thus occupying a volume of the translucent enclosure's 10 interior up to dashed line A.

Figure 3:
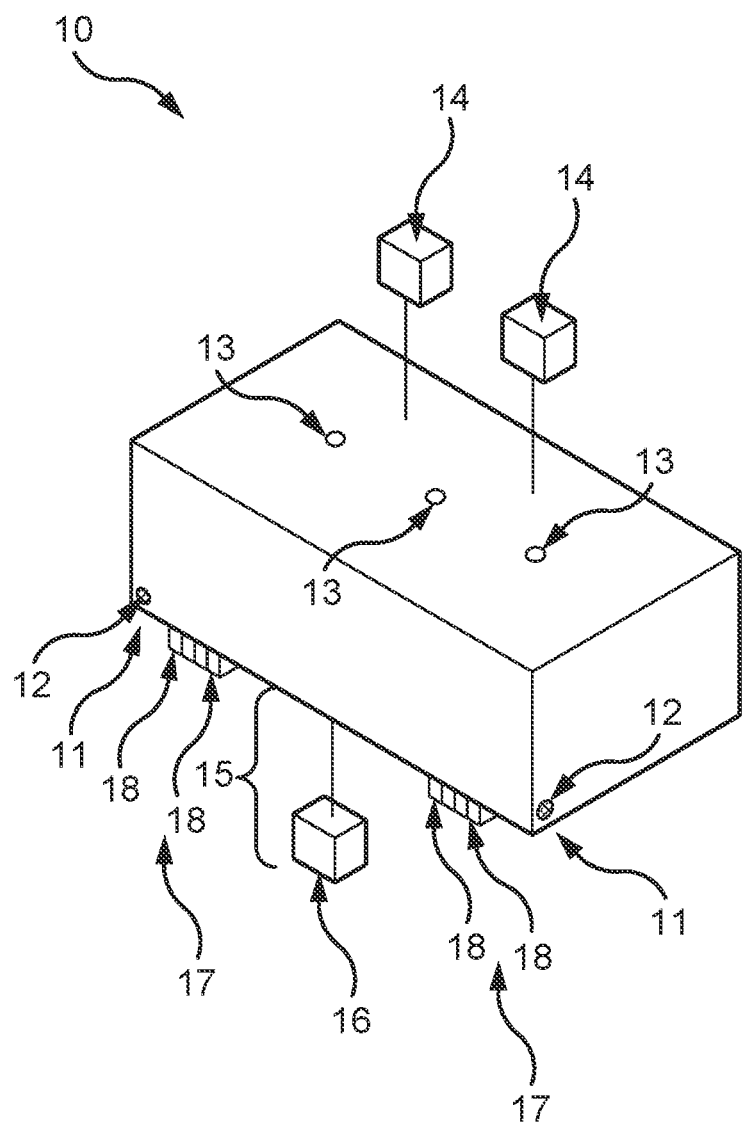
FIG. 3 is a perspective view of an alternative embodiment of a wet soil plant nursery system's translucent enclosure.

Turning now descriptively to FIG. 3, FIG. 3 illustrates a wet soil plant nursery system's translucent enclosure 10 from a perspective/isometric view.

In FIG. 3, a translucent enclosure 10 can be seen (albeit embodied differently when compared to FIG. 2). Additionally, elements such as the translucent enclosure's 10 at least one aperture 11, semi-permeable material 12, at least one opening 13, at least one motion system attachment member 14, buoyancy system 15, and buoyancy device 16 can also be seen. With continued reference to FIG. 3, two sensor array systems 17 can be seen (each comprising sensor devices 18), which are affixed to a translucent enclosure 10. A translucent enclosure 10 may have multiple sensor array systems 17 affixed thereon, therein, and thereto. The sensor array systems 17 may be configured to collect and transmit environmental setting data. By way of non-limiting example, the sensor array systems 17 are configured to collect and transmit data relating to water conditions (e.g. salinity level, ammonia level etc.) and other related weather conditions (including the timing of high and low tides/the changing tides). The sensor array system 17 may comprise a range of different sensor devices 18, or just one sensor device 18. As should be apparent, sensor array systems 17 (and their sensor devices 18) may be exposed to the interior or exterior of a translucent enclosure 10. Sensor devices 18 may be, and are not limited to, image sensors, temperature sensors, sunlight sensors/light-sensitive transmitters, depth sensors, pH sensors, salinity sensors, ammonia sensors, ammonium sensors, accelerometers, electrochemical sensors (for hydric soil conditions), oxygen sensors, weather condition sensors, or pressure sensors. Sensor array systems 17 (and their sensor devices 18) may be powered by at least one battery (as will be subsequently described) or powered by batteries internal to each sensor device 18 or sensor array system 17.

Sensor array systems 17 may serve a range of different functions but are primarily oriented towards monitoring conditions related to wet soil plant growth. For example, a translucent enclosure 10 may comprise one sensor array system 17 on the exterior of the translucent enclosure 10 (a first sensor array system) and another sensor array system 17 on the interior of the translucent enclosure 10 (a second sensor array system, not depicted in FIG. 3). The first sensor array system 17 may comprise a range of sensor devices 18, such as salinity sensors, depth sensors, ammonia sensors, and ammonium sensors, each of the sensor devices 18 measuring quantifiable data which may be beneficial to monitor for ensuring optimal growth of a wet soil plant. The second sensor array system 17 may comprise a range of sensor devices 18, such as sunlight sensors/light-sensitive transmitters, oxygen sensors, electrochemical sensors, ammonia sensors, ammonium sensors, and depth sensors, each of the sensor devices 18 measuring quantifiable data which may be beneficial to monitor for ensuring optimal growth of a wet soil plant. Continuing the above example, should a second sensor array system 17 comprise a electrochemical sensor as a sensor device 18, the electrochemical sensor may be operatively connected to the translucent enclosure 10 and configured and dimensioned to be placed in at least one soil filled semi-permeable membrane (as will be subsequently described and as not depicted in FIG. 3) in a fashion which allows the electrochemical sensor to break away from the at least one soil filled semi-permeable membrane when acting in conjunction with the plant placement system (as will be subsequently described and as not depicted in FIG. 3). Moreover, as both the first and second sensor array systems 17 in the example above comprise ammonia sensors and ammonium sensors (sensor devices 18), the sensor devices' 18 measurements on each first and second sensory array system 17 may be compared to determine if quantifiable measurements on the exterior of the translucent enclosure 10 (as measured by the first sensor array system 17 for ammonia and ammonium levels) differ from quantifiable measurements within the translucent enclosure 10 (as measured by the second sensor array system 17 for ammonia and ammonium levels).

Thus, as each sensor array system 17 is measuring quantifiable data, each sensor array system may be in operative communication with at least one computing device (which is not depicted in FIG. 3 and as will be subsequently described). Sensor array systems 17 (and their sensor devices 18) may be able to communicate data in a wired or unwired fashion.

As should be apparent, as a translucent enclosure 10 may have at least one sensor array system 17, a translucent enclosure 10 may have multiple sensor array systems 17 placed over, within, or throughout the translucent enclosure 10.

Figure 4:
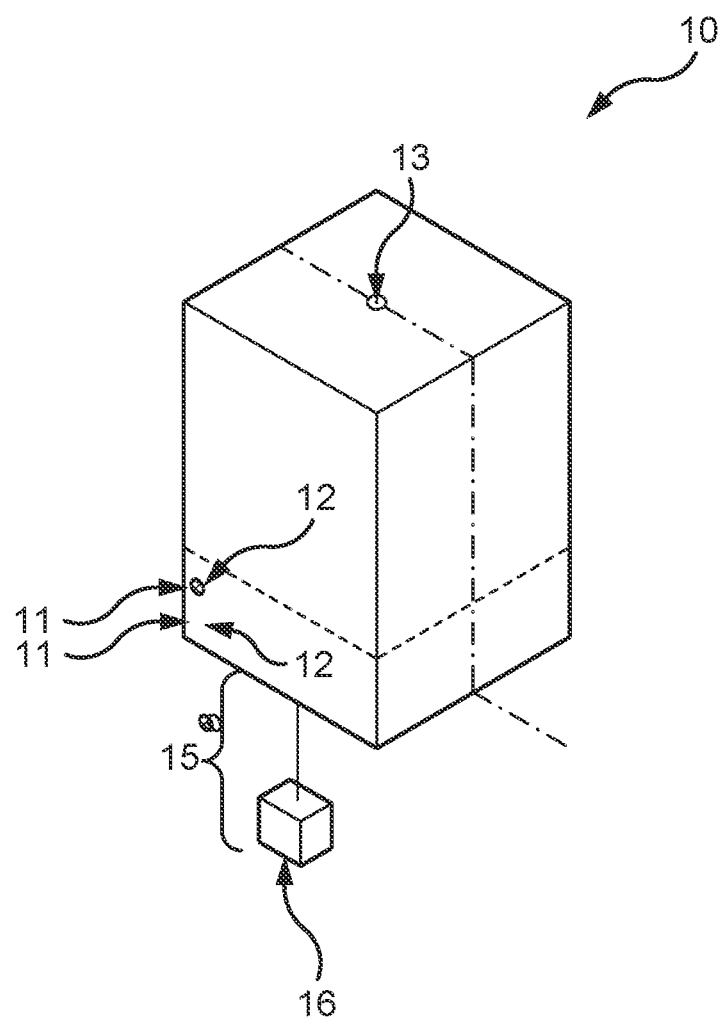
FIG. 4 is a perspective view of a wet soil plant nursery system's translucent enclosure.

Turning now descriptively to FIG. 4, FIG. 4 illustrates a wet soil plant nursery system's translucent enclosure 10 from a perspective/isometric view.

In FIG. 4, a translucent enclosure 10 can be seen. Additionally, elements such as the translucent enclosure's 10 at least one aperture 11, semi-permeable material 12, at least one opening 13, buoyancy system 15, and buoyancy device 16 can also be seen. With reference to FIG. 4, water may engulf the translucent enclosure 10 as indicated by a dashed line A. As a result, FIG. 4 may be used to illustrate that the wet soil plant nursery system's translucent enclosure 10 may be at least partially submerged in water. Moreover, and as described above, as the translucent enclosure 10 may have an exterior and interior, water may engulf the translucent enclosure's 10 exterior up to dashed line A, and pass through the translucent enclosure's 10 aperture(s) 11, thus occupying a volume of the translucence enclosure's 10 interior up to dashed line A. Further, FIG. 4 may be used to illustrate how a cross-section of the translucent enclosure 10 may be taken. As a result, a cross-section of the translucent enclosure (as will be depicted in FIG. 5), can be taken at the dashed and dotted line B.

Figure 5:
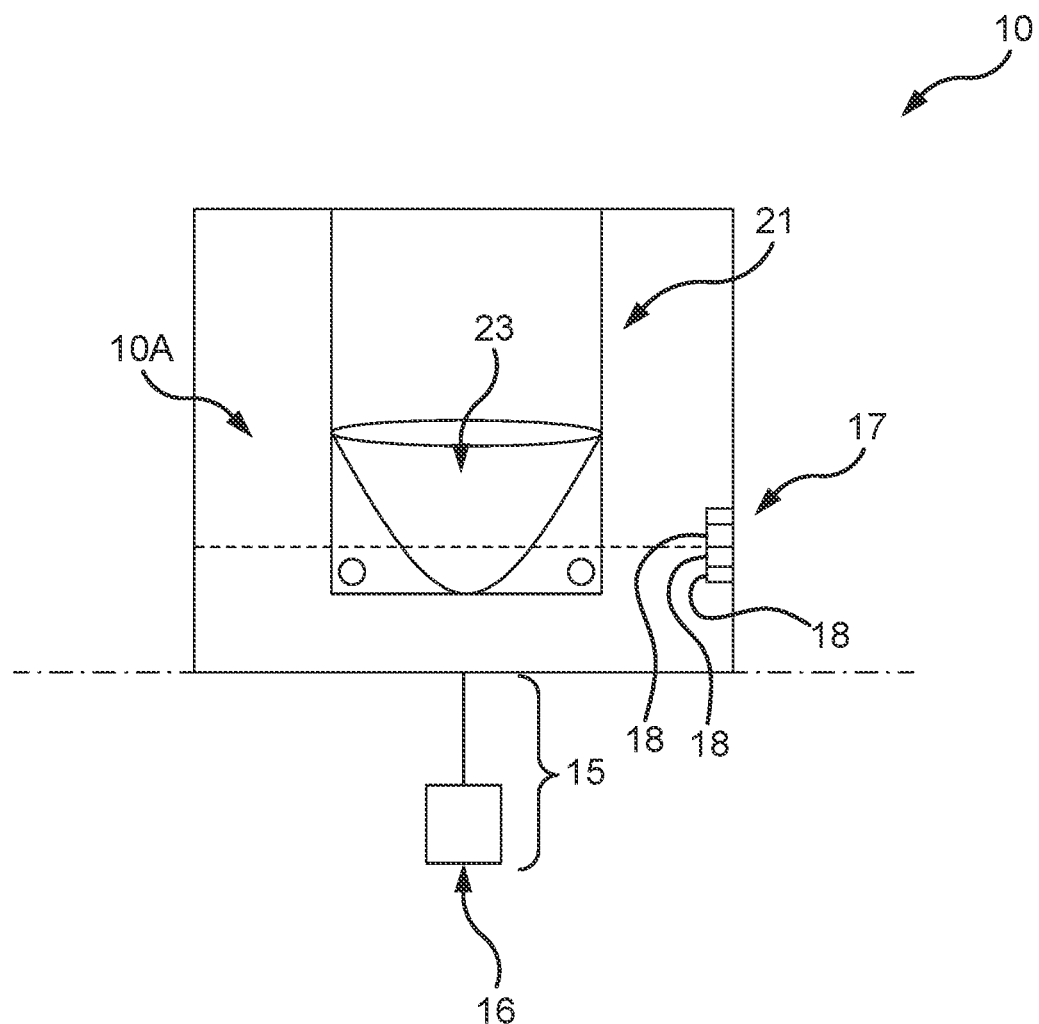
FIG. 5 is a cross sectional, front view of a wet soil plant nursery system's translucent enclosure.

Turning now descriptively to FIG. 5, FIG. 5 illustrates a wet soil plant nursery system's translucent enclosure 10 from a cross-section, front view.

In FIG. 5, a cross section of a translucent enclosure 10 can be seen, as indicated by the dotted and dashed line B. As such, the interior reservoir of the translucent enclosure 10A, can be seen as well as a sensor array system 17 and accompanying sensor device 18 within the interior of the translucent enclosure 10. As previously described, as water may engulf the translucent enclosure's 10 exterior up to dashed line A, water may pass through the translucent enclosure's 10 aperture(s) 11 (not depicted in FIG. 5), thus occupying a volume of the interior reservoir of the translucent enclosure 10A to dashed line A. As should be apparent, dashed line A is only a depiction of how water may occupy a volume of the interior reservoir of the translucent enclosure 10A, and the volume and level of water may either be more or less.

Moreover, in FIG. 5, a plant placement system 21 can be seen. More than one plant placement system 21 may exist within an interior reservoir of a translucent enclosure 10A. A plant placement system 21 may allow a wet soil plant (within at least one semi-permeable membrane 23, as will be subsequently described) to exist thereon or therein. The plant placement system 21 may serve a range of different functionalities but is primarily configured and structured to keep a wet soil plant upright, in place, and able to be planted into a seafloor/hydric soil (at least when paired with a breakaway system, as will be subsequently described).

Firstly, and by way of non-limiting example, as a plant placement system may be structured to keep a wet soil plant upright, a wet soil plant may first be placed in a semi-permeable membrane 23 (as will be subsequently described). Thereafter, the plant placement system 21 may have attachment points which may either puncture the semi-permeable membrane 23 or apply a force to the semi-permeable membrane 23 such that the wet soil plant is unable to move or rotate when forces are applied thereto. For example, the plant placement system 21 may puncture the semi-permeable membrane 23 via stakes which descend from the top of the interior reservoir of the translucent enclosure 10A to the bottom of the interior of reservoir of the translucent enclosure 10A at two diametrically oriented points across the semi-permeable membrane 23 from a top point through a low point, thus not allowing the semi-permeable membrane 23 (and any wet soil plant(s)) within the semi-permeable membrane 23 to rotate or tip over. Alternatively, the plant placement system 21 may comprise two separate walls which allow a semi-permeable membrane 23 to snuggly fit in-between, thus applying two forces at diametrically opposed points across the semi-permeable membrane 23.

Secondly, and continuing the above example, a plant placement system 21 may comprise a floor or surface for a semi-permeable membrane 23 (and a wet soil plant(s)) therein to rest upon. Thus, in effect, a floor and two walls may act as a portion of a plant placement system 21. This floor and two wall plant placement system 21 may be suspended (by use of a motorized pulley system or other means) within the interior reservoir of a translucent enclosure 10A. Thus, the plant placement system may move vertically (through the use of a motorized pulley system or rail system which reacts to buoyancy) within the interior reservoir of a translucent enclosure 10A such that when water fills the interior reservoir of a translucent enclosure 10A, the plant placement system 21 can selectively dispose the semi-permeable membrane 23 (and wet soil plant there) in or out of water. Additionally, should the plant placement system 21 use stakes (as described above), sliders upon these stakes may be used selectively move the semi-permeable membrane 23 vertically. Notably, these stakes may be used to plant the semi-permeable membrane 23 (with at least one wet soil plant therein) into the sea floor when used with sliders and a breakaway system (as will be subsequently described). In effect, the stakes may be able to extend from an interior reservoir of the translucent enclosure 10A to the exterior of a translucent enclosure 10, into the sea floor, then the sliders May push the semi-permeable membrane 23 into the sea floor, and thereafter releasing the semi-permeable membrane 23 from the stakes.

As should be apparent, as a translucent enclosure 10 may have at least one plant placement system 21, a translucent enclosure 10 may have multiple plant placement systems 21 placed within or throughout the translucent enclosure 10. Additionally, the plant placement system 21 may be controlled by at least one computing device (which is not depicted in FIG. 5 and as will be subsequently described).

Further, in FIG. 5, the semi-permeable membrane 23 is depicted. The semi-permeable membrane 23 may be comprised of biodegradable material which is designed to biodegrade over a wet soil plant's growth from seedling to fully grown. Alternatively, the semi-permeable membrane 23 may be designed to biodegrade at a faster rate once a wet soil plant reaches full growth (from seedling to full growth). Additionally, the semi-permeable membrane 23 may have different permeability, qualities, or characteristics when comparing the semi-permeable membrane 23 and the semi-permeable material 12 which associates with the at least one aperture 11 (as described above). The semi-permeable membrane 23 may, but need not be filled with soil. In the event the semi-permeable membrane 23 is filled with soil, it may be filled with hydric soil. As the semi-permeable membrane 23 may be semi-permeable, it may allow for fluids to pass through it, but not solids, such as hydric soil, even when such hydric soil is submerged or engulfed in water. Additionally, the semi-permeable membrane 23 may be configured and dimensioned to allow one or multiple wet soil plants to grow from the seedling phase to the fully grown phase within the semi-permeable membrane 23.

Figure 6:
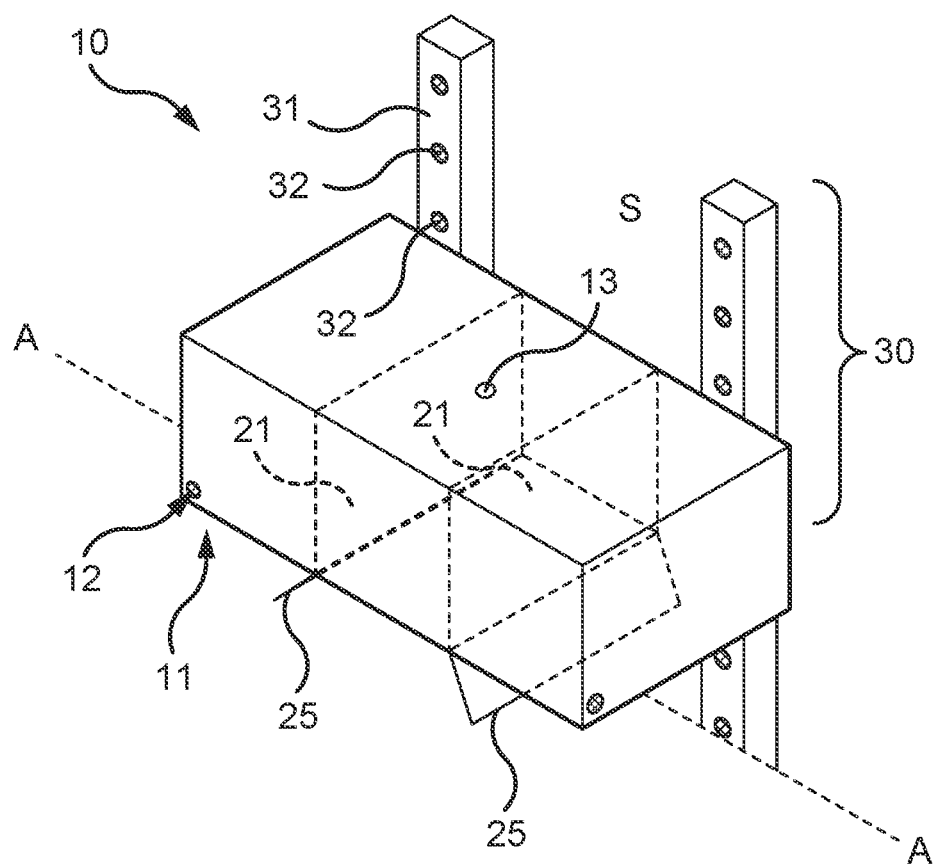
FIG. 6 is a perspective view of a wet soil plant nursery system's translucent enclosure with a breakaway system in an open orientation when paired with a motion system.

Turning now descriptively to FIG. 6, FIG. 6 illustrates a perspective view of a wet soil plant nursery system's translucent enclosure 10 when paired with a motion system 30. Further, FIG. 6 illustrates a perspective view of a wet soil plant nursery system's translucent enclosure's 10 breakaway system 25.

Figure 7:
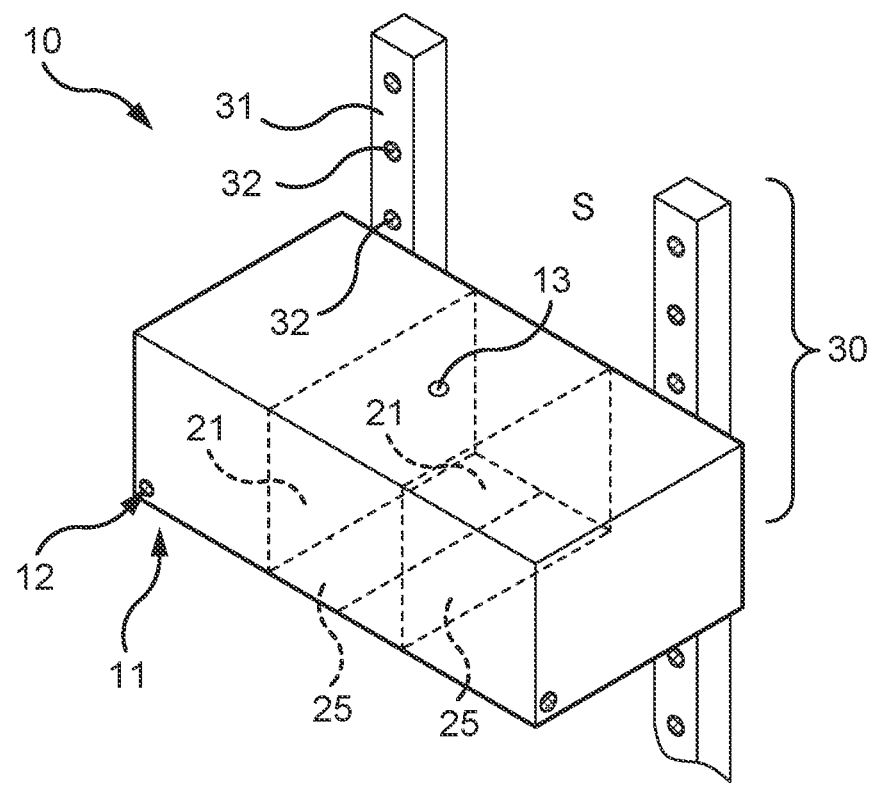
FIG. 7 is a perspective view of a wet soil plant nursery system's translucent enclosure with a breakaway system in a closed orientation when paired with a motion system.

As previously described, the breakaway system 25 may function in conjunction with a plant placement system 21. As a result, in FIG. 6, the plant placement system 21 is depicted (via vertical dashed lines) wherein the plant placement system 21 is functioning as two separate walls which allow a semi-permeable membrane 23 to snuggly fit in-between, thus applying two forces at diametrically opposed points across the semi-permeable membrane 23 (as described above). That said, the breakaway system 25 may embody multiple forms. By way of non-limiting example, the breakaway system 25 is represented as a trap door on the translucent enclosure 10 in FIG. 6. As a result, a portion of the bottom of a translucent enclosure 10 may open (outwardly or inwardly), thus exposing the interior reservoir of the translucent enclosure 10A to elements which may exist on the exterior of the translucent enclosure 10. As a result, the breakaway system 25 may have an open orientation (as depicted in FIG. 6) and a closed orientation (as depicted in FIG. 7). In general, the breakaway system 25 will be in an open orientation so as to allow the plant placement system 21 to release a wet soil plant (and semi-permeable membrane 25) to the elements or sea floor.

As the breakaway system 25 may take many forms, another embodiment of the breakaway system 25 allows for the entirety of the translucent enclosure's 10 floor to open.

Alternatively, the breakaway system 25 may cause the translucent enclosure 10 to split in half (wherein a longitudinal line may divide the split of the translucent enclosure 10). Further, the breakaway system 25 may be, but need not be submerged or engulfed by water in order to operate or change orientations. While FIG. 6 depicts the translucent enclosure 10 and breakaway system 25 as above water A, the translucent enclosure 10 (or parts thereof) and breakaway system 25 may be submerged or engulfed by water when in an open orientation. In general, the breakaway system 25 may operate in conjunction with the plant placement system 21 when a wet soil plant has developed within the translucent enclosure 10 and is in a stage of life where the wet soil plant is able to be planted in the sea floor. Additionally, the breakaway device 25 may be controlled by at least one computing device (which is not depicted in FIG. 6 and as will be subsequently described).

Also shown in FIG. 6 is a motion system 30. The motion system 30 may serve a range of different functionalities and may exist in multiple embodiments. However, the motion system 30 may primarily serve as a system for raising or lowering a translucent enclosure 10. Additionally, a motion system 30 may raise or lower one or more than one translucent enclosure 10. Further, a motion system 30 may be suspended or attached to a sea wall S or be suspended from an aeronautical platform 40 (as will be subsequently discussed) Moreover, a motion system 30 may be controlled by at least one computing device so as to raise or lower at least one translucent enclosure 10.

Figure 8:
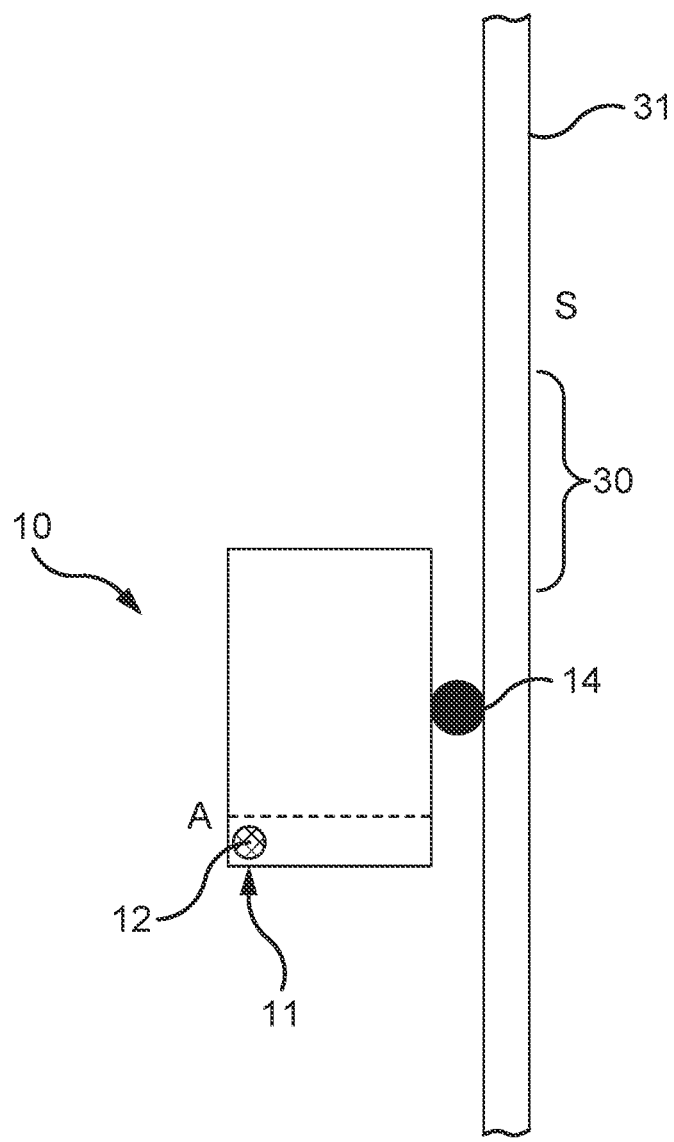
FIG. 8 is a side view of a wet soil plant nursery systems' translucent enclosure when paired with a motion system.

As a motion system 30 may embody multiple different forms, one such form may be a roller rail system, as depicted in FIGS. 6, 7, and 8 and attached/suspended to a sea wall S. The translucent enclosure 10 may comprise at least one motion system attachment member 14 (as not depicted in FIG. 6 or 7 but is depicted in FIG. 8). The motion system attachment member 14 may thus attach to a hook on a set of rollers (not depicted) located within a beam 31 of the motion system 30. The rollers (not depicted) may be connected to a rope (not depicted) and motorized pulley system (not depicted), thereby allowing the translucent enclosure 10 to move in conjunction with the rollers when attached/affixed to the motion system 30 via at least one motion system attachment member 14. Alternatively, the rollers (not depicted) need not be connected to rope, but instead only connected to beams 31, and thus may allow a translucent enclosure 10 to rise or fall upon a motion system 30 because of rising water levels or in conjunction with a buoyancy system 16. Alternatively, the motion system 30 may be manually controlled, wherein beams 31 comprise keyholes 32 which are structured to receive pins (which may act as motion system attachment members 14, allowing a translucent enclosure 10 to affix/attach to the motion system 30).

As a motion system 30 may embody multiple different forms, one such from may be a crane or set of cranes (not depicted), which may attach at a motion system attachment point to an aeronautical platform (as will be subsequently described). The crane or cranes may thus, using a hook or comparable attachment point device, attach to at least one motion system attachment member 14 of at least one translucent enclosure 10. As a result, the crane or cranes may operatively connect at least one translucent enclosure 10 in a moveable relation to at least one aeronautical platform 40 (as will be subsequently described).

Figure 9:
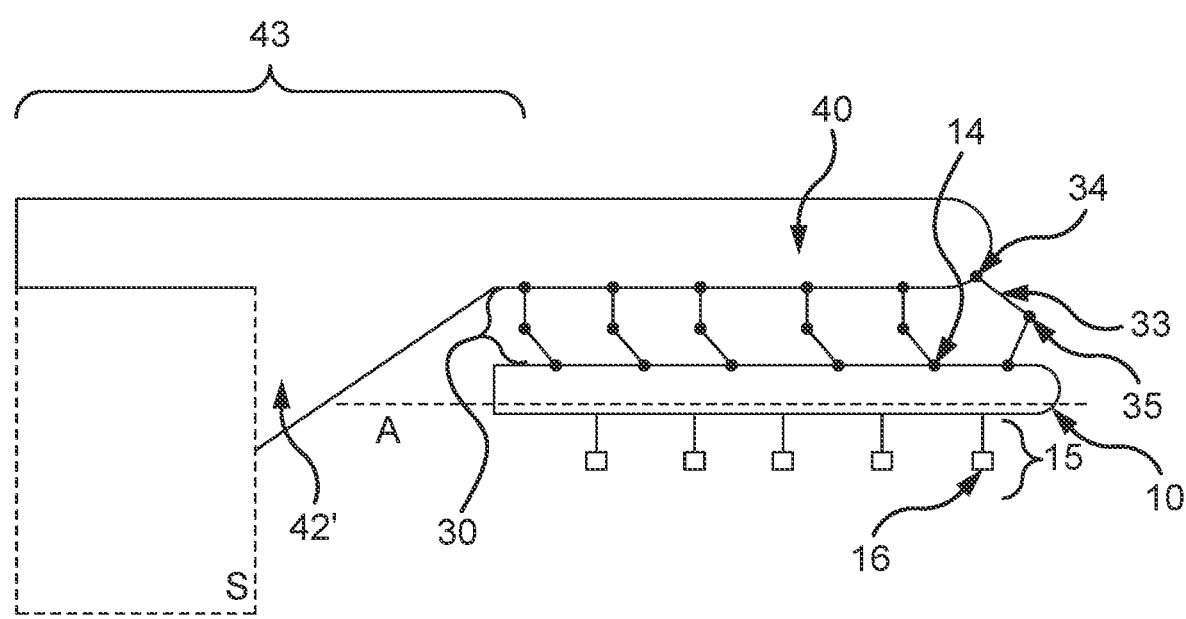
FIG. 9 is a side view of a wet soil plant nursery system.

As a motion system 30 may embody multiple different forms, another such form may be a hydraulic arm or set of hydraulic arms (as depicted in FIG. 9 as 33). With brief reference to FIG. 9, the hydraulic arms 33 may attach at a motion system attachment mechanism to an aeronautical platform 34. The hydraulic arms 33 may allow for an extension or compression of at least one part of the hydraulic arms 33 using a hydraulic pump. The hydraulic arms 33 may thus, using a hook or comparable attachment point device, attach to at least one motion system attachment member 14 of at least one translucent enclosure 10. Moreover, the hydraulic arms may have pivot points 35. Such pivot points 35, may allow for a translucent enclosure 10 to rotate about such pivot points 35 (either by way of adjusting the buoyancy of the translucent enclosures 10 via the at least one buoyancy system 16, by way of rising/falling tides, or by way of both). Thus, the hydraulic arms 33 (acting as a motion system 30 as a whole per the previous description), are configured and dimensioned to operatively connect said at least one translucent enclosure 10 in a moveable relation to at least one aeronautical platform 40. In addition, the hydraulic arms 33 (acting as a motion system 30 as a whole per the previous description) may allow at least one translucent enclosure 10 to become in parallel to a face of an aeronautical platform 41 with an aeronautical platform 40. As a result, the aeronautical platform 40 may be surrounded with at least one translucent enclosure 10 at the same or substantially the same height.

Turning now descriptively to FIG. 7, FIG. 7 illustrates a perspective view of a wet soil plant nursery system's translucent enclosure 10 when paired with a motion system 30. Further, FIG. 7 illustrates a perspective view of a wet soil plant nursery system's translucent enclosure's 10 breakaway system 25 wherein the breakaway system 25 is in the closed orientation.

Turning now descriptively to FIG. 8, FIG. 8 illustrates a side view of a wet soil plant nursery system's translucent enclosure 10 when paired with a motion system 30. Further, FIG. 8 illustrates a translucent enclosure's 10 motion system attachment member 14 operatively attaching the translucent enclosure 10 to the motion system 30.

Turning now descriptively to FIG. 9, FIG. 9 illustrates a side view of a wet soil plant nursery system with at least one translucent enclosure 10 operatively connected (by way of a motion system 30) to an aeronautical platform 40. Additionally, elements such as at least one buoyancy system 15, at least one buoyancy device 16, a motion system 30 (with accompanying motion system attachment mechanisms to an aeronautical platform 34, pivot points, and motion system attachment mechanisms 14) can be seen. The aeronautical platform 40 may be supported by a support beam 42 and may be extended off of a sea wall S, ending within or attached to a walkway 43. With reference to FIG. 9, water may rise to a level below or at the aeronautical platform 40, as indicated by horizontal dashed line A.

The aeronautical platform 40 (and accompanying walkway 43) may be comprised of a ballistic grade translucent material. Such material may be, but need not be made from recyclables, such as plastics which have been formed from post-consumer waste like milk jugs or other household plastics. The material may be translucent enough to allow sufficient sunlight to reach objects located below the aeronautical platform 40 (and accompanying walkway 43) so as to not interrupt sea life which may exist below the aeronautical platform 40 (and accompanying walkway 43). The aeronautical platform 40 and walkway 43 may conjoin/affix together using conjoining means or be formed of one single molded material. Additionally, metal plating may be used on portions of the aeronautical platform 40 and walkway 43 where individuals may be standing or walking on the aeronautical platform 40 and walkway 43. However, the aeronautical platform 40 does not need to have a walkway 43. Indeed, the aeronautical platform 40 may comprise supports (not depicted) which allow the platform to stand alone, partially or fully, over a body of water (with all other portions of the present disclosure related to the translucent enclosure 10 connected thereto).

Moreover, and while not depicted in FIG. 9, the aeronautical platform may comprise a face, which itself is configured and dimensioned to perform a range of functions. For example, the aeronautical platform may be structured to allow for aircraft to take off and land via using the aeronautical platform. Such aircraft may be, but are not limited to, unmanned aircraft, drones, manned drones, autonomous aircraft, or semi-autonomous aircraft, and manned aircraft. Further, the aeronautical platform may be structured to allow aircraft to deposit materials (such as raw goods, packages, or otherwise goods transportable by aircraft) to the aeronautical platform's face. Further, the aeronautical platform may be structured to host a suite of flight data electronics (as will be subsequently described). To accomplish this function, the aeronautical platform may have cavities or protrusions which may house at least one suite of flight data electronics (and individual electronics associated therewith). Additionally, the aeronautical platform may be structured to allow humans to safely enter or exit aircraft which may be resting on the aeronautical platform or allow humans to safely retrieve deposited materials from the aeronautical platform. Alternatively, the aeronautical platform may allow humans to rest materials (such as raw goods, packages, or otherwise goods transportable by aircraft) on the aeronautical platform's face such that an aircraft may pick up such materials and fly the materials away. As should be apparent, the aeronautical platform may also comprise motion system attachment mechanisms upon the aeronautical platform.

With continued reference to FIG. 9, the aeronautical platform 40 may be supported by a support beam 42, the aeronautical platform 40 may be supported by a support beam 42 and may be extended off of a sea wall S, ending within or attached to a walkway 43. The support beam 42 may be attached to a walkway 43 by stainless steel bolts. Additionally, the support beam 42 may be attached to the sea wall S via stainless steel bolts.

Figure 10:
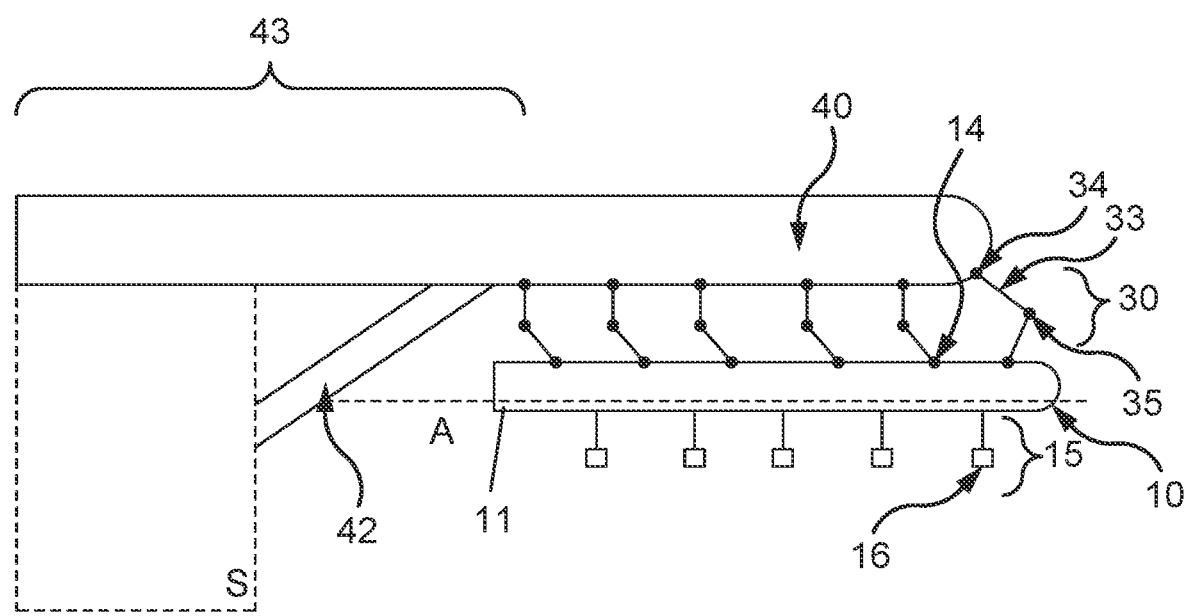
FIG. 10 is a side view of an alternative embodiment of a wet soil plant nursery system.

Turning now descriptively to FIG. 10, FIG. 10 illustrates a side view of a wet soil plant nursery system with at least one translucent enclosure 10 operatively connected (by way of a motion system 30) to an aeronautical platform 40. Additionally, elements such as at least one buoyancy system 15, at least one buoyancy device 16, a motion system 30 (with accompanying motion system attachment mechanisms to an aeronautical platform 34, pivot points 35, and motion system attachment mechanisms 14) can be seen. The aeronautical platform 40 may be supported by a rigid structure 42' and may be extended off of a sea wall S and into walkway 43. With reference to FIG. 10, water may rise to a level below or at the aeronautical platform 40, as indicated by horizontal dashed line A. As the aeronautical platform 40 (and walkway 43) may be supported by a rigid structure 42', the rigid structure 42' may take a variety of shapes and or lengths so as to rest upon a top of a sea wall S and exert a force onto a sea wall's S side wall. The rigid structure 42' need not, but may be bolted into (using stainless steel bolts) the sea wall's S side wall. As the rigid structure 42' need not be bolted into the sea wall's S side wall, the rigid structure 42', walkway 43, aeronautical platform 40, and everything affixed/connected thereto may rotate about the sea wall S (as will be subsequently described).

Figure 11:
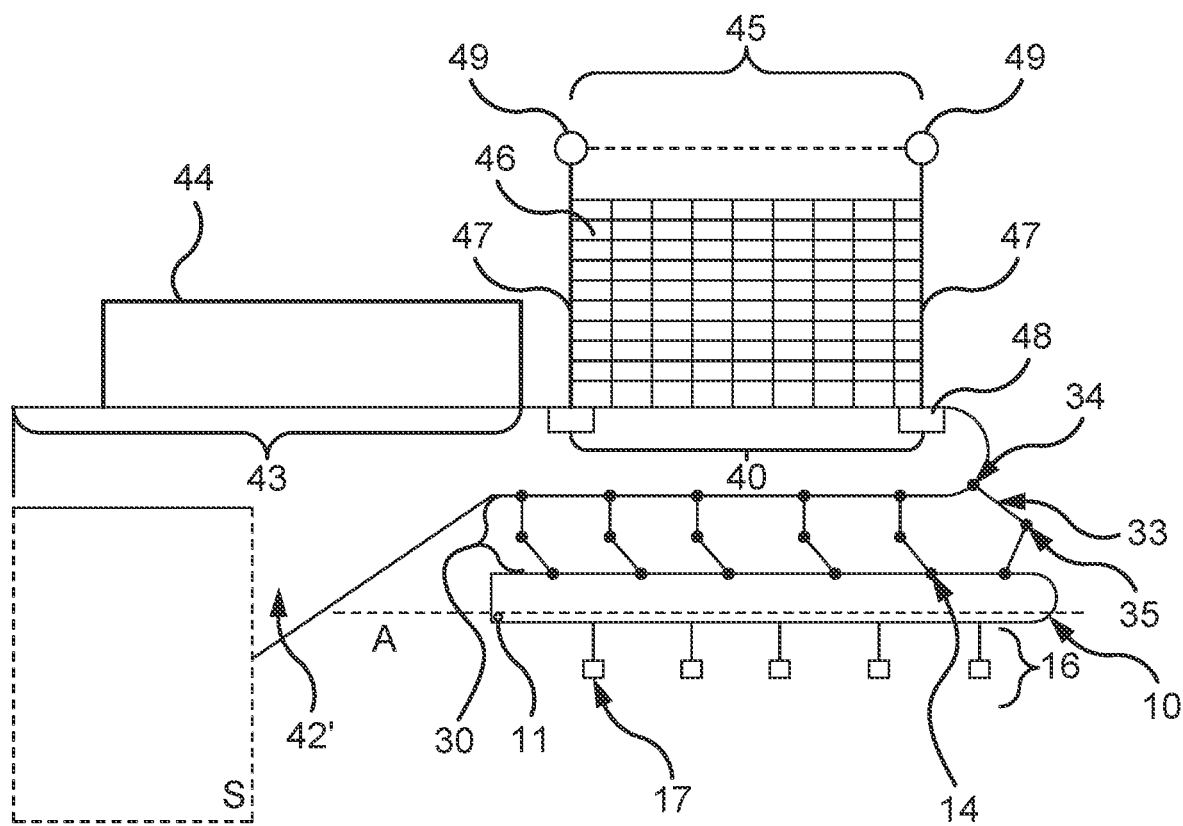
FIG. 11 is a side view of an alternative embodiment of a wet soil plant nursery system.

Turning now descriptively to FIG. 11, FIG. 11 a side view of a wet soil plant nursery system with at least one translucent enclosure 10 operatively connected (by way of a motion system 30) to an aeronautical platform 40. Additionally, elements such as at least one buoyancy system 15, at least one buoyancy device 16, a motion system 30 (with accompanying motion system attachment mechanisms to an aeronautical platform 34, pivot points 35, and motion system attachment mechanisms 14) can be seen. With continued reference to FIG. 11, a railing 44 may exist on the walkway 43. The railing may be made out of translucent material, which may include recyclables, such as plastics which have been formed from post-consumer waste like milk jugs or other household plastics. Moreover, the railing may comprise lighting (not depicted) to light up the walkway 43.

Further, the aeronautical platform 40 may have a net system 45 which exists upon the face of the aeronautical platform 41. The net system 45 may comprise one or more nets 46, net structures 47, and net hinges 48. The net system 45 may be connected to the aeronautical platform 40 via net hinges 48. Cavities may be formed in the aeronautical platform 40 so as to insert hydraulic, motorized, or mechanical hinges (net hinges 48) into the aeronautical platform 40. The net hinges 48 may also have a receiver therein structured to receive a net structure 47. As a result, a net structure 47 can be inserted into a net hinge 48. A net 46 may be cast across a net structure 47, forming a mesh. The net structures 47 comprise LEDs 49 atop the net structures 47 for visibility or honing/location systems on aircraft. As the net structures 47 (and nets 46 and LEDs 49) may be inserted into a net hinge 48, the net hinge 48 may rotate so as to allow the net structure 45 to move into an operative orientation or non-operative orientation. When in the closed orientation, the net structure 45 may rest upon the aeronautical platform's face 41 (not depicted). When in the open orientation, the net structure may exist in a perpendicular or angled orientation in relation to the aeronautical platform's face 41, as depicted in FIG. 11.

By way of non-limiting example, the net structure 45 may be in the operative orientation to collect or catch packages. An aircraft may fly by the wet plant nursery system with a cable attached to the aircraft and materials hung from the cable. The aircraft may maneuver such that the materials are released and caught by the net structure 45, or the aircraft may maneuver such that the materials are caught by the net structure 45 then subsequently released by the aircraft. As previously stated, the net structure may move into and out of the operative and non-operative orientations and can do so via a net hinge 48. Should the net hinge 48 be hydraulic or motorized, the net hinge 48 may be controlled by at least one computing device (as will be subsequently described).

Figure 12:
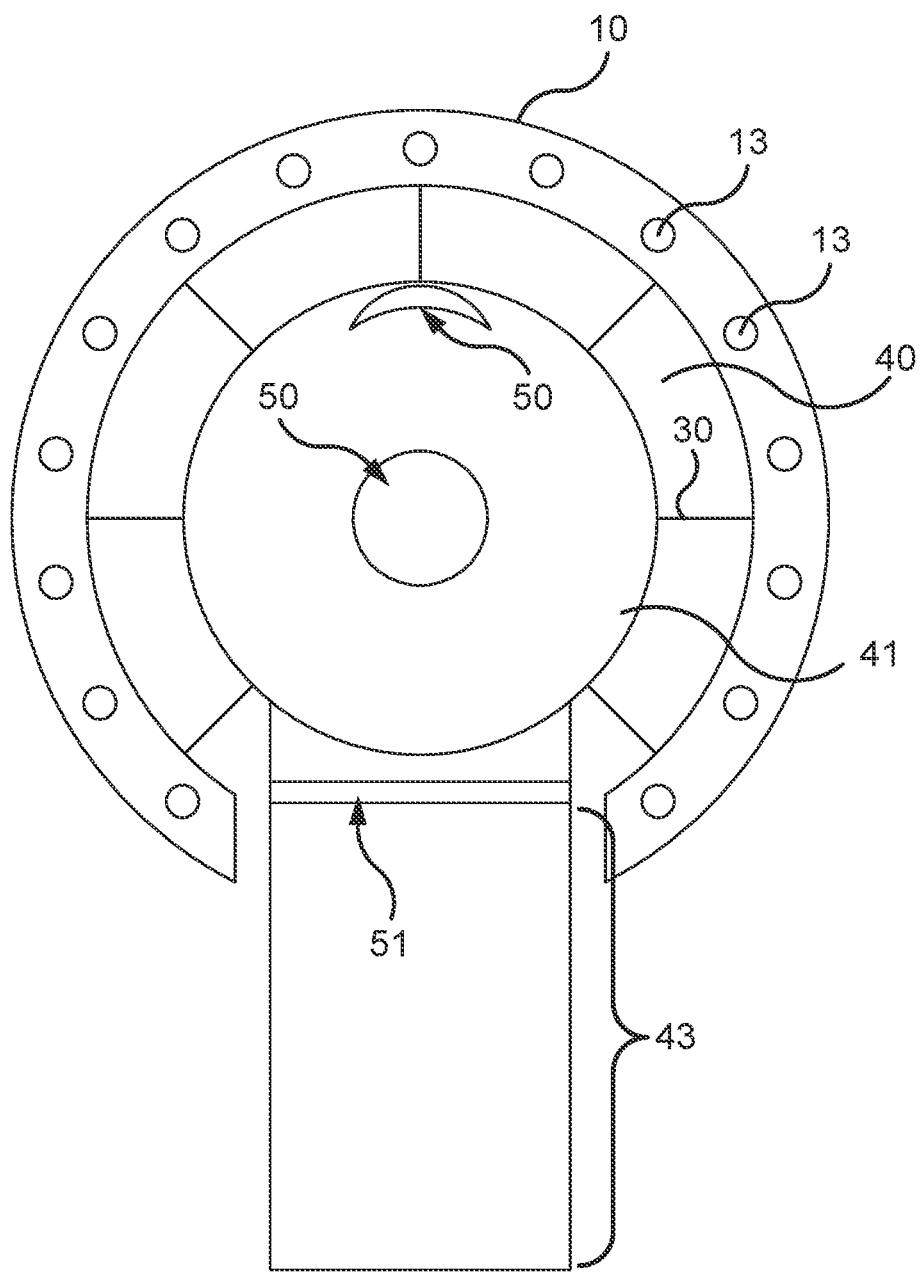
FIG. 12 is a top/bird's eye view of a wet soil plant nursery system.

Turning now descriptively to FIG. 12, FIG. 12 illustrates a top/bird's eye view of a wet soil plant nursery system. FIG. 12 illustrates at least one translucent enclosure 10, openings 13, at least one motion system 30, an aeronautical platform 40, an aeronautical platform's face 41, and a walkway 43. As should be inherent, more than one aeronautical platform 40 may be present, however, FIG. 12 only depicts one aeronautical platform 40. Additionally, FIG. 12 depicts at least one gate 51, and at least one suite of flight data electronics 50.

With continued reference to FIG. 12, the gate 51 can be seen as dividing the aeronautical platform 40 from the walkway 43. In effect, the gate 51 may prevent humans from traversing onto or off of the face of the aeronautical platform 41 without a lock and key, or other device to traverse the gate 51. The gate 51 may have a range of devices to prevent humans from traversing onto or off of the face of the aeronautical platform 41 including, but not limited to, lock and key, RIFD tag and receiver paired with a magnetic lock, latch, or transmitter and receiver paired with a lock.

With continued reference to FIG. 12, two examples of suites of flight data electronics 50 can be seen. As should be apparent, one or more than one suite of flight data electronics 50 may be paired or used with the present disclosure. Moreover, a suite of flight data electronics 50 may be comprised of one or more electronic devices (not depicted). For example, electronic devices May include image sensors, weight scales, LED lights, proximity sensors, sonar, wind speed sensors, temperature sensors, altimeters, GPS locators, accelerometers, level sensors, or magnetometers. A suite of flight data electronics 50 may also be in operative communication with at least one computing device (as will be subsequently described). While suites of flight data electronics 50 may perform a range of different functions, they may be primarily oriented towards assisting aircraft use the aeronautical platform 40 (as previously described), take off/land on the aeronautical platform 40, locate the aeronautical platform 40, or inform users an aircraft has used the aeronautical platform.

By way of non-limiting example, an aeronautical platform may use image sensors, weight scales, LED lights, proximity sensors, wind speed sensors, altimeters, accelerometers, and level sensors as part of at least one suite of flight data electronics 50. In such an example, LED lights May form lighted indicia upon (such as numbers or symbols) the face of the aeronautical platform 41 so as to identify or assign the aeronautical platform 41 a location and/or identifiable number. Such LED lights may be used by an aircraft so as to locate an aeronautical platform 41 (among other aeronautical platforms or generally).

Continuing such example, proximity sensors, wind speed sensors, altimeters, accelerometers, and level sensors may transmit data related to wind speed on the aeronautical platform 40, the altitude of the aeronautical platform 40, the altitude of the aeronautical platform 40, how level the aeronautical platform 40 is, and if any objects are in close proximity to the aeronautical platform 40 to at least one computing device (as will be subsequently described). In turn, the at least one computing device may format and/or transmit such data to at least one aircraft such that the aircraft may use such data to use the aeronautical platform 40 (as previously described). Further continuing such example, should a weight sensor and image sensor sense (and convert the sensing into data) that an aircraft has used the aeronautical platform 40, the suite of flight data electronics 50 may communicate such data to at least one computing device (which will be subsequently described).

The suite of flight data electronics may be powered by at least one battery (as will be subsequently described) through wired connection. Notably, as FIG. 13 depicts a battery as resting on a sea wall S, a battery may be resting on or near the aeronautical platform 40 or its face 41.

Figure 13:
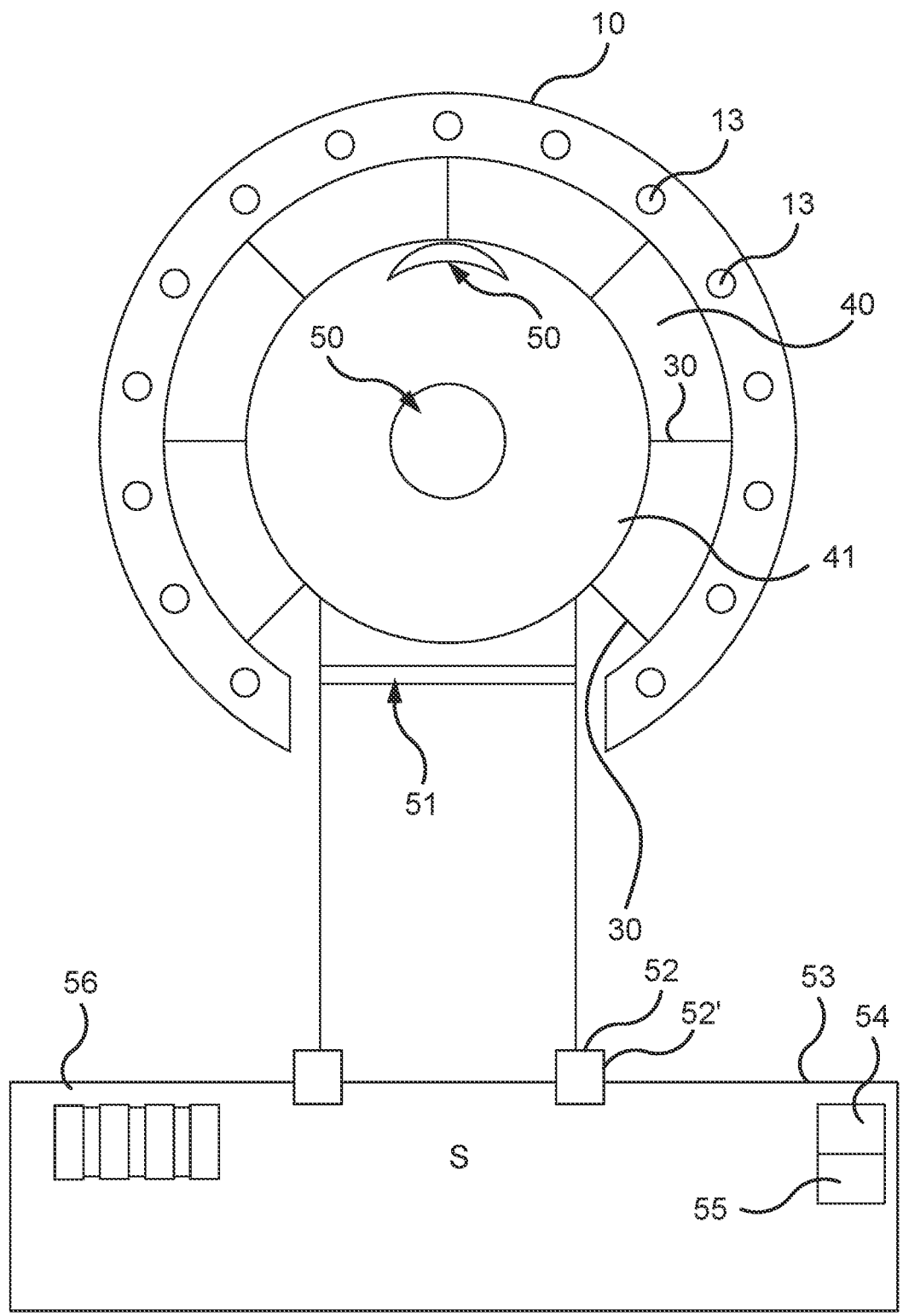
FIG. 13 is a top/bird's eye view of an alternative embodiment of wet soil plant nursery system.

Turning now descriptively to FIG. 13, FIG. 13 illustrates a top/bird's eye view of a wet soil plant nursery system. FIG. 13 illustrates at least one translucent enclosure 10, openings 13, at least one motion system 30, an aeronautical platform 40, an aeronautical platform's face 41, a walkway 43, a gate 51, and at least one suite of flight data electronics 50. As should be inherent, more than one aeronautical platform 40 may be present, however, FIG. 13 only depicts one aeronautical platform 40. Additionally, FIG. 13 depicts at least one hinge attachment member 52, at least one hinge 52', a power box 53, at least one computing device 54, a battery 55, and at least one renewable energy source 56.

With continued reference to FIG. 13, at least one hinge attachment member 52 may be affixed to a walkway 43. The hinge attachment member 52 may be a rod or receiver, structured to penetrate or receive a hinge 52'. A hinge 52' may be powered by hydraulic, motor, or mechanical means, (wherein such means are connected to at least one computing device, as will be subsequently described). The hinge 52' may allow for rotation (and subsequently rotate whatever is received or penetrated, such as the hinge attachment member 52, which may be affixed to a walkway 43, and multiple elements of the present disclosure are affixed to the walkway 43). As such, the hinge 52' may allow for substantial portions of the wet soil plant nursery system to rotate about a sea wall S. Thus, the wet soil plant nursery system may be placed in an operative and non-operative orientation (however, no figure depicts the non-operative orientation).

With continued reference to FIG. 13, a power box 53 may also be a part of the wet soil plant nursery system. While FIG. 13 depicts a power box 53 on a sea wall S, the power box 53 may be located on or within an aeronautical platform 40. The power box 53 may be a hurricane and waterproof box which houses at least computing device 54 and at least one battery 55.

At least one computing device 54 may be powered by the battery 55 and comprise communications hardware so as to be able to communicate in a controlling and receiving fashion to the multiple portions of the wet soil plant nursery system in communication with the at least one computing device 54. Moreover the at least one computing device 54 may be structured to connect to the internet and various remote devices such as aircraft or other computing devices. One feature of the at least one computing device 54 is it may take data or information from the multiple portions of the wet soil plant nursery system (and, optionally, process such data) so as to transmit data or reports to remote devices. Another feature of the at least one computing device 54 is to take data or information from the multiple portions of the wets soil plant nursery system (and, optionally, process such data) so as to control remote devices (such as aircraft).

Additionally, the power box 53 may have an opening therein to allow power to be transferred (by wire) from at least one renewable energy source 56 (as will be described) to the battery 55. Moreover, the power box 53 may have an opening therein to allow power to be transferred (by wire) from a battery 55 to subsequent portions of the wet soil plant nursery system. Additionally, the power box 53 may have at least one renewable energy source 56 affixed thereon.

With continued reference to FIG. 13, at least on renewable energy source 56 may also be a part of the wet soil plant nursery system. While FIG. 13 depicts at least one renewable energy source on a sea wall S, the at least one renewable energy source 56 may be located on or within an aeronautical platform 40. The at least one renewable energy source 56 may be, but is not limited to a solar panel, a set of solar panels, a windmill, a set of windmills, a hydroelectric generator, a set of hydroelectric generators, or a combination thereof. The at least one renewable energy source 56 may be structured to send power to the power box 53 and/or battery 55.

Figure 14:
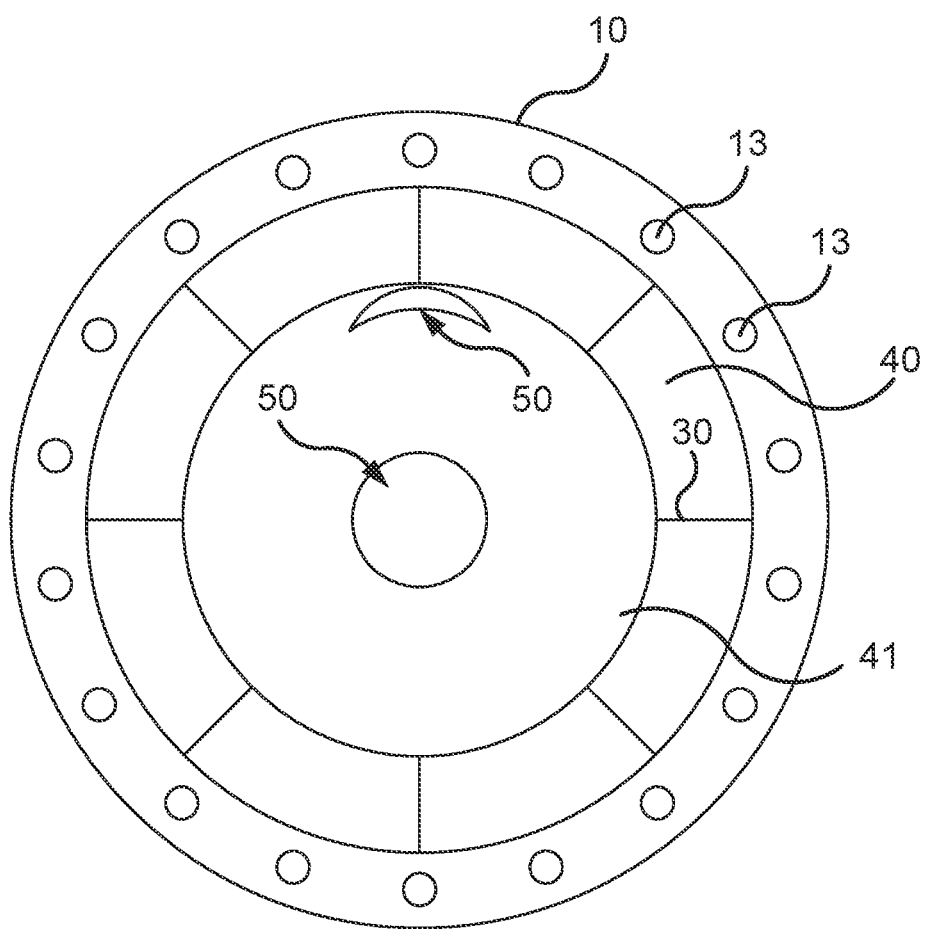
FIG. 14 is a top/bird's eye view of an alternative embodiment of wet soil plant nursery system.

Turning now descriptively to FIG. 14, FIG. 14 illustrates a top/bird's eye view of a wet soil plant nursery system. FIG. 13 illustrates at least one translucent enclosure 10, openings 13, at least one motion system 30, an aeronautical platform 40, an aeronautical platform's face 41 and at least one suite of flight data electronics 50.

It is intended that all matters in the foregoing description and shown in the accompanying drawings be interpreted as illustrative and not in a limiting sense.

What is claimed is:

1. A wet soil plant nursery system comprising:
   at least one translucent enclosure;
   said at least one translucent enclosure having at least one interior reservoir, said at least one interior reservoir configured to retain fluid;
   said at least one translucent enclosure comprising at least one aperture, said at least one aperture configured and dimensioned to allow fluid to pass therethrough;
   said at least one aperture comprising a semi-permeable material therein;
   said at least one translucent enclosure comprising at least one opening, said at least one opening structurally configured to facilitate the upward growth of at least one wet soil plant; and
   said at least one translucent enclosure comprising at least one motion system attachment mechanism, said at least one motion system attachment mechanism structurally configured to be affixed to said at least one translucent enclosure in a moveable relation to at least one aeronautical platform.

2. The wet soil plant nursery system of claim 1 further comprising at least one buoyancy system affixed to said at least one translucent enclosure, said at least one buoyancy system structurally configured to assist said at least one translucent enclosure in floating and comprising at least one buoyancy device.

3. The wet soil plant nursery system of claim 1 further comprising a sensor array system affixed to said at least one translucent enclosure, said sensor array system configured to collect and transmit environmental setting data.

4. The wet soil plant nursery system of claim 3 wherein said sensor array system is in operative communication with at least one computing device.

5. The wet soil plant nursery system of claim 1 wherein said at least one interior reservoir further comprises at least one plant placement system, said at least one plant placement system configured to foster the growth of at least one wet soil plant.

6. The wet soil plant nursery system of claim 5 wherein said at least one plant placement system further comprises at least one soil filled semi-permeable membrane configured and dimensioned to allow the at least one wet soil plant to inhabit said at least one soil filled semi-permeable membrane.

7. The wet soil plant nursery system of claim 1 wherein said at least one translucent enclosure further comprises a breakaway system, said breakaway system configured to facilitate the positive geotropism of the at least one wet soil plant, said breakaway system having an open orientation and a closed orientation.

8. The wet soil plant nursery system of claim 1 wherein said at least one translucent enclosure is operatively attached to at least one motion system via said at least one motion system attachment mechanism.

9. The wet soil plant nursery system of claim 1 wherein said at least one translucent enclosure is configured and dimensioned to operatively connect with other translucent enclosures.

10. A wet soil plant nursery system comprising:
    at least one translucent enclosure;
    said at least one translucent enclosure configured and dimensioned to operatively connect with at least one second translucent enclosure;
    said at least one translucent enclosure further comprising at least one buoyancy system affixed to said at least one translucent enclosure, said at least one buoyancy system configured to assist said at least one translucent enclosure in floating;
    said at least one translucent enclosure operatively attached to at least one motion system; and
    said at least one motion system configured and dimensioned to operatively connect said at least one translucent enclosure in a moveable relation to at least one aeronautical platform.

11. The wet soil plant nursery system of claim 10 wherein said at least one aeronautical platform is comprised of translucent material.

12. The wet soil plant nursery system of claim 10 wherein said at least one aeronautical platform comprises at least one motion system attachment mechanism, said at least one motion system attachment mechanism structurally configured to be affixed to said at least one translucent enclosure.

13. The wet soil plant nursery system of claim 10 wherein said at least one aeronautical platform is configured and dimensioned to affix to a walkway.

14. The wet soil plant nursery system of claim 13 wherein said walkway comprises a hinge attachment member.

15. The wet soil plant nursery system of claim 14 wherein said hinge attachment member is configured and dimensioned to affix to a hinge wherein said hinge is configured and dimensioned to rotate said walkway about a sea wall.

16. The wet soil plant nursery system of claim 10 wherein said at least one aeronautical platform further comprises a suite of flight data electronics.

17. The wet soil plant nursery system of claim 16 wherein said suite of flight data electronics is operatively powered by at least one battery.

18. The wet soil plant nursery system of claim 16 wherein said at least one battery is operatively powered by at least one renewable energy source.

19. The wet soil plant nursery system of claim 16 wherein said suite of flight data electronics is in operative communication with at least one computing device.

20. A wet soil plant nursery system comprising:
    at least one translucent enclosure;
    said at least one translucent enclosure operatively attached to at least one motion system;
    said at least one motion system configured and dimensioned to operatively connect said at least one translucent enclosure in a moveable relation to at least one aeronautical platform; and
    said aeronautical platform affixed to a hinge wherein said hinge is configured and dimensioned to rotate said aeronautical platform about a sea wall.

* * * * *